United States Patent

[11] 3,545,352

| [72] | Inventor | Alfred H. Bellows<br>Cambridge, Mass. |
|---|---|---|
| [21] | Appl. No. | 731,942 |
| [22] | Filed | May 24, 1968 |
| [45] | Patented | Dec. 8, 1970 |
| [73] | Assignee | Polaroid Corporation<br>Cambridge, Mass.<br>a corporation of Delaware |

[54] EXPOSURE CONTROL APPARATUS FOR A PHOTOGRAPHIC CAMERA
3 Claims, 11 Drawing Figs.

[52] U.S. Cl. .............................................. 95/10, 95/60
[51] Int. Cl. .............................................. G03b 7/08, G03b 9/16
[50] Field of Search...................................... 95/10C, 95/53, 95/53 Elec op, 95/60

[56] References Cited
UNITED STATES PATENTS
2,443,164  6/1948  Harvey................... 95/60
3,205,795  9/1965  Grey...................... 95/10(C)
3,230,852  1/1966  Rigolini................. 95/60

*Primary Examiner*—John M. Horan
*Attorney*—Brown & Mikula and William D. Roberson and James L. Neal ABSTRACT: A shutter arrangement for photographic apparatus in which a manually operated shutter actuator member is designed to perform two functions during an exposure sequence. As the actuator member is manually depressed, it first contacts a holding latch which, in turn, causes the independent and exposure causing release of spring driven shutter blades. Manual release of the spring loaded actuator member permits its engagement of the released shutter blades and causes their return to an initial, preexposure position. The spring load upon the actuator member is sufficient to overcome the forces exerted by springs driving the shutter. The arrangement is characterized in providing for somewhat consistent and undeviating manual release pressures throughout an exposure sequence.

PATENTED DEC 8 1970

INVENTOR
Alfred H. Bellows

BY

Brown and Mikulka
and
James L. Neal
ATTORNEYS

SUMMARY OF THE INVENTION

The exposure control apparatus of this invention includes shutter means, shutter drive means continuously biasing the shutter means for exposure influencing movement from a reset position to a rundown position, holding means for releasably retaining the shutter means in its reset position, and an actuating and cocking mechanism. The actuating and cocking mechanism is movable between a first position and a second position and biased toward the first position by reset drive means.

In operation, the actuating and cocking mechanism is moved from its first position toward and to its second position for storing energy in the reset drive means and then releasing the holding means to permit exposure influencing movement of the shutter means, under the influence of the shutter drive means. Energy stored in the shutter drive means is not accumulated by and does not act upon the actuating and cocking mechanism during movement thereof from its first to its second position. When the shutter is released near the end of the stroke of the actuating and cocking mechanism, the resisting force of the reset drive means acting upon the actuating and cocking mechanism remains active thereupon. Thus, at the end of the stroke of the actuating and cocking mechanism, upon release of the shutter drive means, no jerk or shock is occasioned by sudden release of energy.

Subsequent to each exposure, the reset drive means returns the actuating and cocking mechanism to its first position and, means responsive to operation of the reset drive means during return of the actuating and cocking mechanism returns the shutter means to its reset position, against the action of the shutter drive means.

It is a primary object of this invention to provide exposure control apparatus which is substantially free from jerks or shocks just prior to or during the exposure interval.

It is also an object of this invention to provide exposure control apparatus for a photographic camera involving an actuating and cocking mechanism constructed so that, upon shutter release, no significant change in the force on the actuator occurs.

DETAILED DESCRIPTION OF THE DRAWINGS

Figure 1:
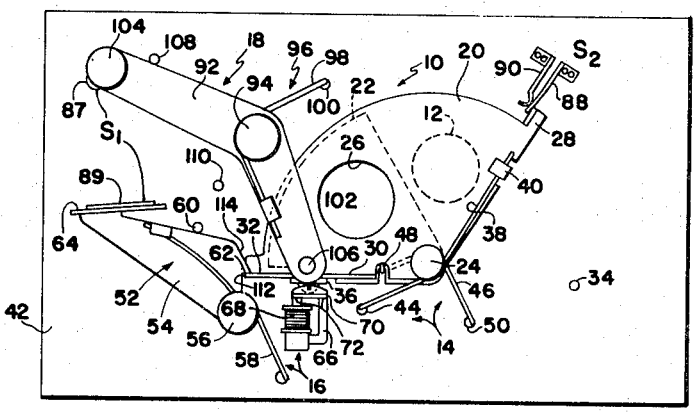
FIGS. 1 through 4 illustrate a preferred embodiment of this invention in various stages of operation.
Figure 2:
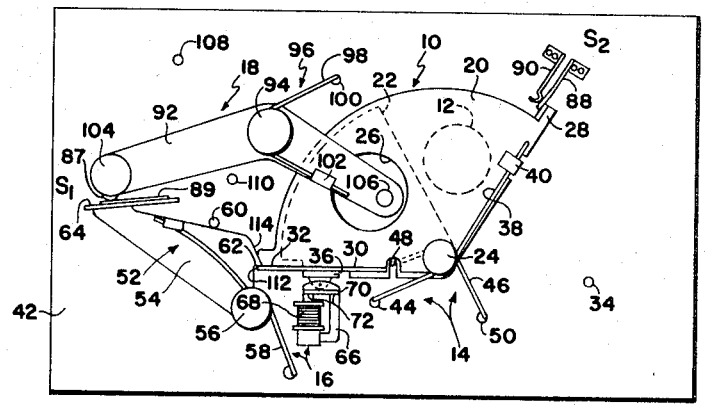

A preferred embodiment of the invention will now be discussed in connection with FIGS. 1 through 5.

The apparatus includes shutter means 10 for blocking and unblocking movement relative to means 12 forming an exposure aperture, shutter drive means 14, holding means 16 and actuator means 18, the actuator means first effecting release of the shutter means for exposure producing movement from a reset position to a rundown position and subsequently returning the shutter means to its reset position.

Shutter means 10 includes opening blade 20 and closing blade 22. The opening blade is pivotally mounted upon support 24 for movement from a reset position to a rundown position for initiating a photographic exposure and includes aperture 26, switch operating extension 28, engageable means 30 and extension 32. Stop means 34 halts movement of the opening blade in its rundown position. Closing blade 22, also pivotally mounted upon support 24, is movable from a reset position to a rundown position for terminating exposure and includes projection 36.

Shutter drive means 14 comprises two springs, spring 38 being wound about support 24 and attached to opening blade 20 at connection 40 and mounted to base block 42 at 44 for continuously biasing and driving the opening blade clockwise from its reset position to its rundown position wherein it simultaneously, fully opens the exposure aperture and abuts stop means 34. Spring means 46 is wound around support 24 and attached to the closing blade at connection 48 and to the base plate at connection 50 for continuously biasing and driving the closing blade from its reset position to its rundown position wherein it blocks the exposure aperture; the projection thereon engages an edge of opening blade 20 to halt movement of the closing blade in its rundown position.

Holding means 16 comprises a first means for releasably holding the opening blade in its reset position and a second means for releasably holding the closing blade in its reset position.

First holding means 52 includes lever 54 pivotally mounted upon support 56, spring means 58 for biasing the lever for clockwise movement, retaining projection 62 and surface 64. Clockwise movement of the lever 54 is limited by stop 60. Retaining projection 62 is engageable with extension 32 and surface 64 cooperates with actuator means 18, hereafter to be described.

The second holding means retains the closing blade in its reset position after movement of the opening blade from its reset position and involves an electromagnet and electrical control circuit 65. The electromagnet includes U-shaped core 66, electrically energizable coil 68 wound around one leg of the core and magnetizable keeper 70 pivotally attached to the projection 36 of closing blade 22. Coil 68 is included in circuit 65 as shown schematically in FIG. 5. The free ends 72 of the core are coplanar and cooperable with magnetizable keeper 70, the core of the electromagnet being positioned adjacent the reset position of the closing blade so that free ends 72 are positioned for contact with the keeper when the closing blade is in the aforesaid reset position, and keeper 70 and core 66 thereby defining a complete magnetic circuit. When coil 68 is energized, a sufficient magnetomotive force is applied to the magnetic circuit to hold the keeper against the core, in opposition to the force of spring 46, and thus retain the closing blade in its reset position.

Figure 5:
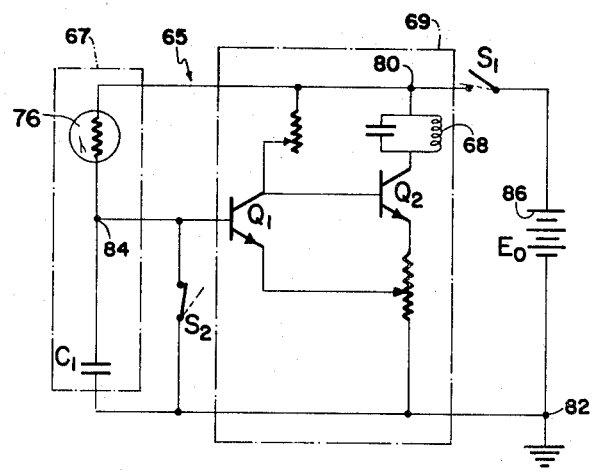
FIG. 5 is a schematic wiring diagram of an electrical control circuit usable with the apparatus of FIGS. 1 through 4.

Control circuit 65, shown in FIG. 5, incorporates timing circuit 67 and trigger circuit 69. Timing circuit 67 includes photoresponsive element 76, such as a cadmium sulfide photocell or the like exposed to light from a scene being photographed and characterized by resistance related to the level of scene brightness and capacitor $C_1$ connected in series between terminals 80 and 82. Circuit 67 constitutes an integrating circuit responsive to the light level of the scene being photographed, the input terminal of which is at 80 and the output terminal of which is at 84. Trigger circuit 69 may be, for example, a transistorized two-stage Schmitt type trigger circuit responsive to the output voltage of timing circuit 67. A circuit of this type is shown and fully described in U.S. Pat. No. 3,241,471, issued to John P. Burgarella on Mar. 22, 1966. Trigger circuit 69 has an input that is a normally not-conducting stage including transistor $Q_1$ and an output that is a normally conducting stage including transistor $Q_1$. While the two stages of the trigger circuit are referred to as "normally not-conducting" and "normally conducting," it should be obvious that this characterization is applicable only when a voltage source is supplied across terminals 80 and 82. Voltage source 86 is shown in the form of a battery of potential $E_o$ connected between terminals 82 and 80 through normally open switch $S_1$. Switch $S_1$ is closed to apply voltage across terminals 82 and 80 during initiation of exposure producing operation of the apparatus, in a manner hereafter to be described. Switch $S_1$ must be mounted for closure prior to disengagement of opening blade 20 by holding means 52. For example, switch $S_1$ may include terminals 87 and 89; terminal 89 may be mounted upon surface 64 of lever 54 and terminal 87 may be mounted on enlarged portion 104 of lever 92 so that the terminals will be brought into contact upon initial engagement between levers 54 and 92. Circuit 65 also includes switch $S_2$ having poles 88 and 90 wherein pole 88 is normally biased out of contact with pole 90 and adapted to be thrown into contact therewith by switch operating extension 28 when opening blade 20 is in its reset position.

The shutter mechanism thus includes a first shutter blade movable from a reset position to a rundown position for initiating exposure and a second blade movable from a reset position to a rundown position for terminating exposure. The second blade is releasably retained in its reset position after movement of the first blade from its reset position by an electromagnet. Circuit means 65 operates to cut off the flow of current to the electromagnet to free the second blade for movement to its rundown position a predetermined timed interval after movement of the first blade from its reset position toward its rundown position. Movement of the first blade from its reset position permits switch $S_2$ to open to initiate the timing operation and thereby control the time of release of the second blade.

At the instant switch $S_1$ is closed, and before switch $S_2$ is opened by movement of the first blade from its reset position, a ground potential voltage is applied at terminal 84. When switch $S_2$ is opened, there appears at output terminal 84 a voltage which changes from the initial value, e.g., ground potential, to a predetermined value during a period of time dependent upon the value of capacitor $C_1$ and the resistance of photoresponsive element 76. When the potential at terminal 84 reaches the aforesaid predetermined value, the normally not-conducting transistor $Q_1$ is forward biased and conducts whereupon the normally conducting transistor $Q_2$ is switched to its not-conducting stage. When transistor $Q_2$ is switched to its not-conducting stage, coil 68 of the electromagnet is deenergized to release the second blade for exposure terminating movement.

Actuator means 18 includes lever 92 pivotally mounted upon support 94, drive means 96 incorporating spring 98 wound around support 94 and anchored to base block 42 at 100 to lever 92 at 102. The lever incorporates an enlarged end 104 for facilitating manual movement of the lever against the force of drive means 96 and engaging projection 106 for cooperation with engageable means 30. Spring 98 continuously biases lever 92 in the clockwise direction with a force which is greater than the combined forces exerted by springs 32 and 34 upon shutter blades 20 and 22 respectively. Stops 108 and 110 limit movement of the lever in the clockwise and counterclockwise directions, respectively.

Figure 3:
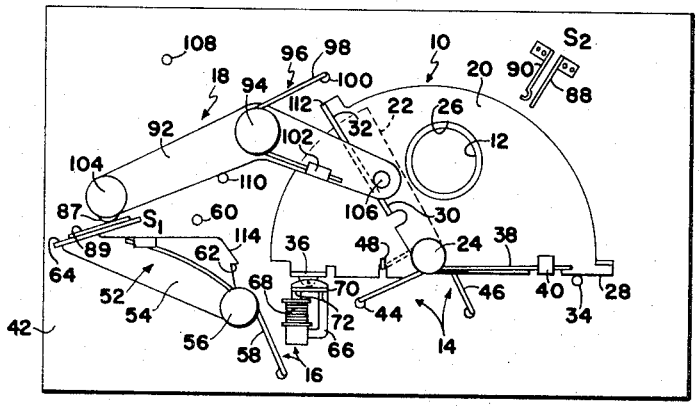

The operation of the aforedescribed embodiment of this invention will now be described. To initiate operation lever 92 is manually rotated counterclockwise from the position shown in FIG. 1 to that shown in FIG. 2, against the bias of spring 98. Terminal 87 contacts terminal 89 to close switch $S_1$ and thereby energizes circuit 65. Energization of circuit 65, in turn, energizes coil 68 and the electromagnet for retaining closing blade 22 in its reset position. Counterclockwise movement of lever 92 after closure of switch $S_1$ causes enlarged end 104 to press surface 64 of lever 54 downward to effect counterclockwise movement of lever 54, against the action of spring 58. This movement disengages retaining projection 62 from opening blade extension 32 to thereby release the opening blade for clockwise movement from its reset position toward its rundown position according to the bias of drive spring 38. Closing blade 22 is retained in its reset position by magnetic engagement between core 66 and magnetizable keeper 70 of the electromagnet. Clockwise movement of opening blade 20 continues until an edge portion thereof abuts stop 34, at which position aperture 26 in the opening blade entirely unblocks the exposure aperture. This condition is illustrated in FIG. 3.

Initial movement of opening blade 20 causes switch operating extension 28 to move out of engagement with terminal 88 of switch $S_2$ to permit switch $S_2$ to open and thereby initiate the timing operation discussed above. At the end of the timed interval, the duration of which is controlled by circuit means 65 in accordance with the light level of the scene being photographed in the manner aforesaid, coil 68 and the electromagnetic holding means is deenergized thus ending the magnetic attraction between core 66 and keeper 70; the closing blade 22 is thus released for counterclockwise movement from its reset position toward its rundown position in accordance with the bias of spring 46. Clockwise movement of blade 22 continues until projection 36 thereon engages an edge portion of opening blade 20 to terminate movement of the closing blade. In this position, closing blade 22 entirely blocks the exposure aperture to thereby terminate the exposure interval.

Figure 4:
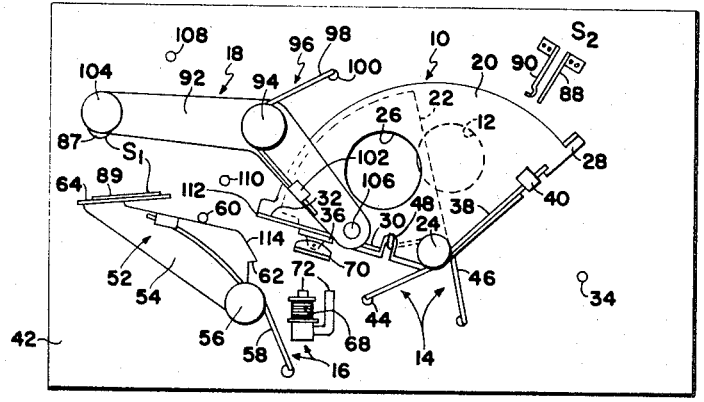

The manual pressure imparted to enlarged end 104 producing the exposure for effecting the exposure producing operation is released subsequent to exposure. Spring 98 of the actuator drive means 96 imparts clockwise movement to lever 92. Switch $S_1$ opens and lever 54 returns to a position against stop 60. Engaging projection 106 extends from lever 92 adjacent one end thereof for engagement with engageable means 30 of opening blade 20. Spring 98 is strong enough to overcome the combined action of springs 38 and 46; thus in view of the engagement between projection 36 of blade 22 and a portion of blade 20, continued clockwise movement of lever 92 forces both blade 20 and blade 22 to move counterclockwise against the action of springs 32 and 34. FIG. 4 illustrates the apparatus in transition from the rundown position to the reset position. As counterclockwise movement of the blades continues, edge 112 of extension 23 engages cam surface 114 and urges lever 54 of first holding means 52 counterclockwise until edge 112 moves past retaining projection 62 so that the retaining projection moves into holding relationship with extension 23 of opening blade 20. In this position, lever 54 abuts stop 60. Spring 46 continues to apply a clockwise bias to lever 92 for maintaining the lever in engaging relationship with engageable means 30 for firmly pressing keeper 70 against surfaces 72 of U-shaped core 66. The apparatus is now returned to the condition illustrated in FIG. 1 wherein it is reset for further exposure producing operation.

Figure 6:
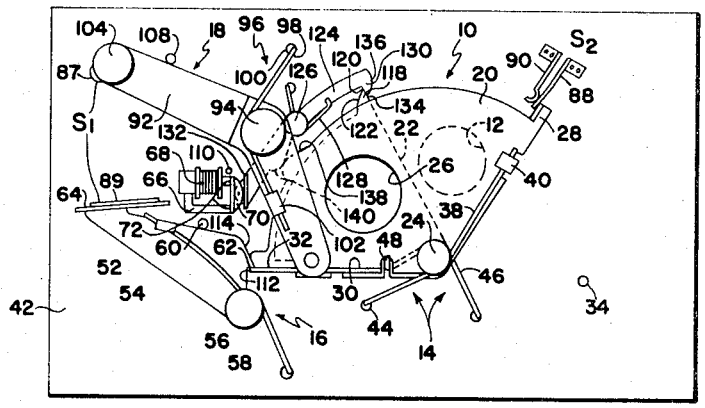
FIG. 6 shows another embodiment of this invention.

Reference is now made to FIG. 6 wherein an alternate second holding means is provided for the apparatus discussed above in connection with FIGS. 1 through 4. Like numbers are used to designate like parts.

In the second holding means of FIG. 6, closing blade 22 includes offset 130 having edge 134 and cam surface 136. Arm 124 is pivotally mounted upon support 126 for cooperation with offset 118 and is biased counterclockwise, by spring means 128, out of engagement with offset 118. Arm 124 includes at one end, offset 130 having edge 134 and cam surface 136 for cooperation with offset 118 in a manner to hereafter be described. At the end of arm 124 opposite the end bearing offset 130, mounting means 132 supports magnetizable keeper 70. The portion of the electromechanical holding means including U-shaped core 66 and coil 68 is cooperatively mounted adjacent keeper so that the keeper is retained against the core when the coil is energized. Cooperating cam members 138 and 140 project from opening blade 20 and arm 124, respectively. These members cooperate during resetting operation in the manner hereafter described to bring offset 130 into engagement with offset 118 and to bring keeper 70 into engagement with core 66.

The operation of the apparatus is substantially like that of FIGS. 1 through 4 except for differences discussed below.

When opening blade 20 moves to its rundown position, projecting portion 138 thereof moves out of engagement with projecting portion 140 of arm 124. Subsequently, when the electromagnetic holding means is deenergized to release closing blade 22, arm 124 is pivoted counterclockwise about support 126 by spring means 128 to lift offset 130 from engagement with offset 128. The closing blade then moves to its rundown position.

During resetting motion of actuator means 18, blades 20 and 22 are returned to their reset positions and offset 118 of blade 22 moves toward the position for engagement by offset 130 of arm 124 as projecting portion 138 of blade 20 engages projection 140 of arm 124. Continued movement of blades 20 and 22 toward their reset positions causes projecting portion 138, by engagement with projecting portion 140, to urge arm 124 clockwise so that offset 118 engages offset 130 and keeper 70 is pressed firmly into cooperative engagement with core 66 substantially simultaneously with engagement of extension 23 of blade 20 by retaining projection 62 of first holding means 52.

Reference is now made to FIGS. 7 through 10 wherein there is shown another embodiment of the present invention in various stages of operation.

Base plate 200 includes means forming an exposure aperture 202 and pivotally supports shutter blade means 204 and actuator means 206. Shutter means 204 is mounted upon support 208 and biased for clockwise movement, from a reset position to a rundown position, by shutter drive spring means 210. Actuator means 206 is mounted upon support 212 and biased for clockwise movement by actuator drive spring means 214, spring means 214 being stronger than spring means 210.

Shutter means 204 includes blade 216 forming aperture 218, engageable means 220 and extension 222. Stop means 224 terminates movement of shutter means 204 in its rundown position.

Figure 7:
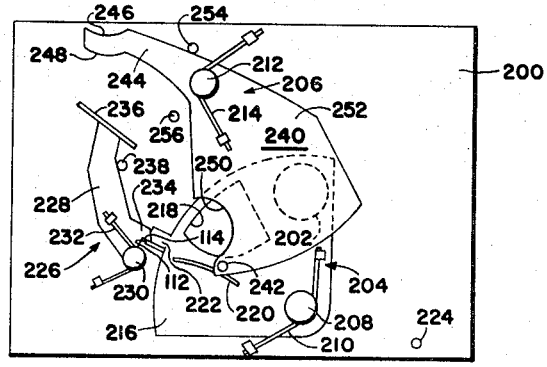
FIGS. 7 through 10 illustrate a further embodiment of the invention in various stages of operation.

Shutter means 204 is releasably held in its reset position, as shown in FIG. 7, by releasable holding means 226. Releasable holding means 226 includes lever 228 pivotally mounted upon support 230 and biased for clockwise movement by spring means 232. The lever includes retaining projection 234 extending therefrom for cooperation with extension 222 of blade means 204 and surface 236 located for cooperation with actuator means 206. Stop means 238 is provided for limiting the clockwise movement of releasable holding means 226.

Actuator means 206 comprises pivotally mounted member 240 including engaging projection 242 at one end for cooperation with engageable means 220 and extension 244. Extension 244 includes contour 246 to facilitate manual manipulation of the actuator means and portion 248 for cooperative engagement with surface 236 of holding means 226.

Member 240 is shaped so that it unblocks the exposure aperture prior to release of the shutter means for exposure producing movement. (See FIG. 8 and note contour 250.) Portion 252 of member 240 adjacent contour 250 is characterized by considerable width so that during the resetting operation this wide portion of member 240 blocks the exposure aperture as aperture 218 of shutter means 204 is passing the exposure aperture. Stop means 254 and 256 limit movement of actuator means 206 in both the clockwise and counterclockwise directions.

Operation of the apparatus shown in FIGS. 7 through 10 will now be described.

Figure 8:
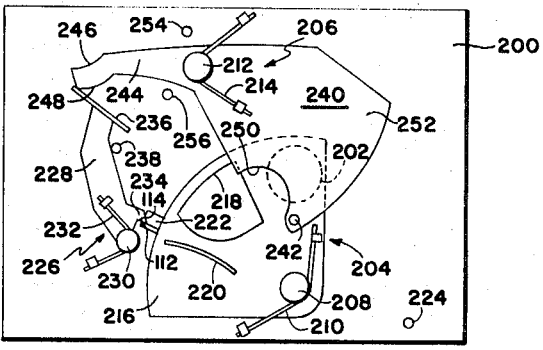
Figure 9:
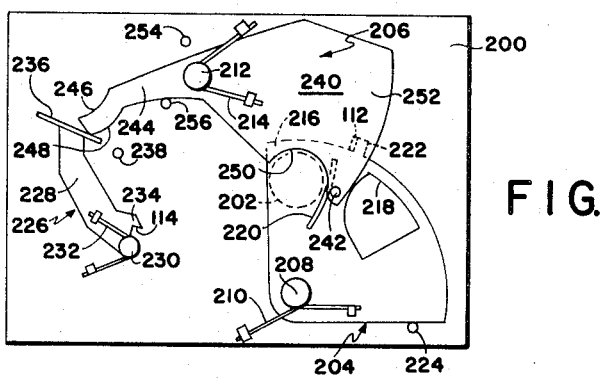
Figure 10:
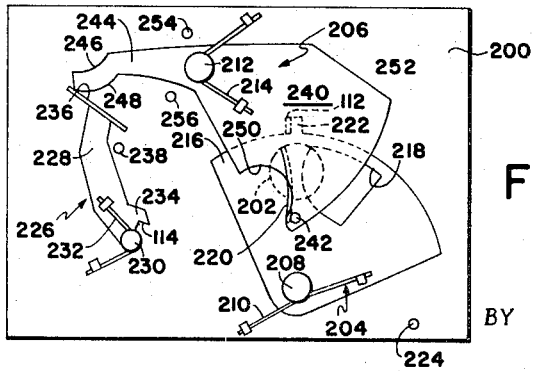

Member 240 of actuator means 206 is moved counterclockwise from the position shown in FIG. 7 to that shown in FIG. 8, against the bias of spring means 214; portion 248 of member 240 contacts surface 236 of lever 228 and substantially simultaneously contour 250 of blade means 240 is positioned to completely unblock the exposure aperture. Continued movement of member 240 moves member 228 counterclockwise against the action of spring 232 to lift retaining projection 234 from extension 222 to thereby release shutter means 204 for clockwise movement from its reset position to its rundown position, under the influence of spring means 210. This condition is shown in FIG. 9. During movement of the shutter means from its reset position to its rundown position, opening 218 in shutter blade 216 scans the exposure aperture to produce a photographic exposure, after which the blade 216 moves to a position wherein it abuts stop 224 and again blocks the exposure aperture.

Upon release of member 240, spring means 214 moves the actuator means clockwise. Member 228 moves to a position against stop 238. Actuator spring 214 is stronger than shutter drive spring 210 so that engaging projection 242 engages engageable means 220 and imparts counterclockwise movement to shutter blade 216, against the bias of spring 210. As clockwise movement of the actuator means and counterclockwise movement of the shutter means continue, portion 252 of member 240 moves into blocking relationship with the exposure aperture prior to movement of opening 218 of the shutter means into unblocking relationship with the aperture during its return to reset position. In this manner, the actuator and the shutter blade cooperate, at all times during resetting operation, to block the exposure aperture (See FIG. 10). Finally, as the shutter means nears its reset position, edge 112 of extension 222 engages cam surface 114 of retaining projection 234 to move the lever 228 of the releasable holding means counterclockwise until the retaining projection moves past edge 112, at which condition it will be moved clockwise by spring 232 so that retaining projection 234 moves into retaining relationship with extension 222 for holding the blade means in its reset position. The apparatus is now returned to the position shown in FIG. 7 and is reset for another exposure producing operation.

Figure 11:
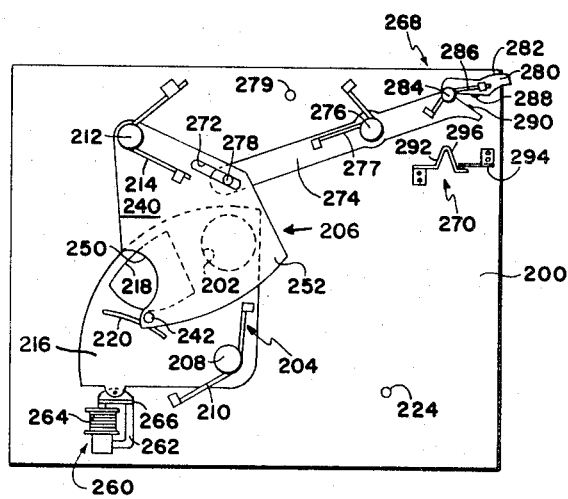
FIG. 11 shows still another embodiment of the invention.

Reference is now made to FIG. 11 wherein there is shown an alternate embodiment of the apparatus shown in FIGS. 7 through 10. Like numbers are used to designate like parts.

Shutter means 204 includes blade 216 forming aperture 218 and engageable means 220. The shutter is releasably held in its reset position, shown in FIG. 11, by releasable holding means 260. The releasable holding means incorporates an electromagnet which includes U-shaped core 262, coil 264 and magnetizable keeper means 266 mounted upon shutter blade 216 for cooperation with the U-shaped core. The releasable holding means further includes switches 268 and 270. These switches are electrically connected in a circuit wherein, upon operation of switch 268, coil 264 is energized, and upon operation of switch 270, coil 264 is deenergized. This may be achieved by biasing switch 268 open and biasing switch 270 closed and connecting the switches in series with each other and with coil 264 and an appropriate electrical power source such as a battery. In this manner, the circuit is completed through the coil only when both switches are closed.

Actuator means 206 includes member 240 pivotally mounted upon support 212, engaging portion 242 for cooperation with engageable means 220 and slot 272 positioned therein for cooperation with lever 274. Lever 274 is pivotally mounted at 276 and may be biased counterclockwise by spring means 277. Spring means 277 is not essential in that lever 244 may be articulated manually on the one hand and in response to movement of actuator means 206 on the other hand. Stop means 279 limits clockwise movement of lever 274. Lever 274 supports pin 278 for cooperation with slot 272 at one end and, at the other end, includes means for facilitating manual actuation of the lever and mounting means for switch 268. Member 280, having surface 282 to which pressure is manually applied to operate the apparatus, is attached by pivotal mounting means 284 to lever 274. Spring means 286 biases member 280 counterclockwise so that a space is provided between member 280 and lever 274. One terminal of switch 268 is mounted in member 280 and the other terminal of the switch is cooperatively mounted upon lever 274. The construction is such that when member 280 is positioned so that the aforesaid space is formed between a portion of member 280 and lever 264, the switch is opened and, when pressure is applied to surface 282, member 280 is pivoted clockwise against the bias of spring means 286 to bring the terminals of switch 268 into contact with each other.

Switch 270 includes terminals 292 and 294. Terminal 294 is fixed; terminal 292 includes an elongated resilient portion which serves to bias the terminal into contact with terminal 294. Terminal 292 is characterized by means 296 arranged for cooperation with lever 274 so that the lever opens the switch during its final movement.

Operation of the apparatus of FIG. 11 will now be described insofar as it differs materially from the operation of the apparatus described in connection with FIGS. 7 through 10.

In the reset position shown in FIG. 11, the force of spring 214 continuously urges member 240 clockwise so that engaging projection 242 abuts engageable means 220 and thereby continuously urges shutter blade 216 counterclockwise, against the bias of spring 210, to urge keeper 266 into firm cooperative relationship with U-shaped core 262.

Operation is effected by manual rotation of lever 274 in the clockwise direction, against the bias of spring means 277, by applying pressure to surface 282. When pressure is initially applied to surface 282, member 280 pivots about pivotal connecting means 284, against the bias of spring means 286 to bring terminal 288 into contact with terminal 290, thus closing switch 268 and energizing coil 264. A closed magnetic circuit is formed by core 262 and keeper 266 so that magnetic attraction between the core and the keeper is effective to hold the shutter means in its reset position. Continued application of pressure upon surface 282 rotates lever 274 clockwise; the cooperation between pin 278 and slot 272 advances member 240 against the bias of spring 214, in the counterclockwise direction so that engaging projection 242 moves away from engageable means 220 and eventually member 240 moves to a position wherein portion 252 thereof is moved out of blocking relationship with the exposure aperture and contour 250 circumscribes a portion of the exposure aperture, shutter blade 216 being retained in its reset position by the electromagnet.

As lever 274 moves clockwise, just before it contacts stop means 279, a portion thereof engages means 296 to move terminal 292 out of contact with terminal 274, thus opening switch 270 and deenergizing coil 264. Shutter means 204 is thus free for clockwise movement under the influence of spring 210. During clockwise movement, aperture 218 scans the exposure aperture to produce photographic exposure and then counterclockwise movement continues until the shutter blade contacts stop means 274, at which point the exposure aperture is again blocked by a portion of the shutter means.

The exposure now being complete, manual pressure is relieved from surface 282. Spring 214 is then free to return member 240 to its preexposure position wherein cooperation between slot 272 and pin 278 returns lever 274 to its preexposure position. Engaging projection 242 cooperates with engageable means 220 for returning the shutter means to its reset position in the same manner as described in connection with FIGS. 7 through 10. Upon initial release of pressure from surface 282, member 280 moves according to the bias of spring means 286 to move terminal 288 from terminal 290 and thus open switch 268; initial counterclockwise movement of lever 274 causes it to move away from engaging relationship with means 296 so that switch 270 is permitted to return to its closed position. The apparatus thus returned to the condition shown in FIG. 11 wherein it is reset for exposure producing operation.

It should be understood that the electromagnetic releasable holding means described in connection with the apparatus in FIG. 11 is there described for purposes of illustration only. Such a holding means might be substituted in any of the above-described embodiments for the mechanical holding means is usable in connection with the embodiment of FIG. 11.

The terms clockwise, counterclockwise, up, down and the like are used with the above-described FIGS. and are not to be taken in a limiting sense.

Since other changes may be made in the above apparatus without departing from the scope of the invention herein involved, it is intended that all matter contained in the above description or shown in the accompanying drawings shall be interpreted as illustrative and not in a limiting sense.

I claim:

1. Photographic exposure control apparatus comprising:
   shutter means including a single blade movable from one position to another, said blade having an exposure opening for unblocking a light path for determining an exposure interval during said movement;
   first drive means biasing said shutter means blade for movement from said one position to the other position;
   holding means including a latching element for releasably retaining said shutter means in said one position against the bias of said first drive means;
   actuator means manually movable from an initial position towards another for effecting release of said holding means to cause said shutter means blade to commence an exposure interval determining movement, said actuator means being engageable with said shutter means blade only for returning said blade from said other position to said one position and being configured to block said light path during said return movement; and
   second drive means for biasing said actuator means to move toward said initial position and for causing said actuator means to exert a force on said blade during said return movement which exceeds the force on said blade exerted by said first drive means.

2. Photographic exposure control apparatus comprising:
   first shutter blade means movable from a first position to a second position for influencing a photographic exposure, said blade means supporting engageable means;
   first drive means continuously biasing said first shutter blade means for movement to its second position;
   first holding means including a latching element for releasably retaining said first shutter blade means in said first position;
   second shutter blade means movable from a first position to a second position for influencing a photographic exposure;
   second drive means continuously biasing said second shutter blade means for movement to it its second position;
   electromagnetic means responsive to the level of illumination of the scene to be photographed for retaining said second blade means in its first position after release of said first blade means and for subsequently releasing said second blade means, the interval between release of said first and said second blade means being dependent upon a level of scene of illumination;
   actuator means movable from an initial position to a final position for sequentially effecting release of said first holding means and activation of said electromagnetic means to permit sequential movement thereof from their respective first positions to their respective second positions and immovable from said final position to said initial position subsequent to exposure, said actuator means including means for engaging said engageable means during movement from said final position for returning said first and second shutter blade means from their respective second positions to their respective first positions; and
   actuator drive means for continuously urging said actuator means towards its initial position, the force exerted upon said actuator means by said actuator drive means being greater than the combined forces exerted upon said first and second shutter blade means by said first and second drive means, said actuator means being movable from its initial position to a final position against the action of said actuator drive means for effecting release of said first and second shutter blade means for exposure influencing movement and being returnable to its initial position by said actuator drive means subsequent to exposure influencing movement of said first and second shutter blade means.

3. Photographic exposure control apparatus of claim 2 in which said electromagnetic means comprises:
   magnetic means connected to said second blade means; and
   core means having surface means positioned for butting relationship with said magnetic means when said second blade means is in its first position, said magnetic means being continuously urged toward a firm abutment with said surface means by the action of said actuator drive means.